(12) United States Patent
Gleason

(10) Patent No.: US 8,752,898 B2
(45) Date of Patent: Jun. 17, 2014

(54) MAIN PIVOT ASSEMBLY FOR INCORPORATING INTO A SEATBACK PIVOTLY SECURED BETWEEN FIRST AND SECOND SUPPORT PLATES

(75) Inventor: Mark L. Gleason, Lake Orion, MI (US)

(73) Assignee: BAE Industries, Inc., Warren, MI (US)

( * ) Notice: Subject to any disclaimer, the term of this patent is extended or adjusted under 35 U.S.C. 154(b) by 270 days.

(21) Appl. No.: 13/347,062

(22) Filed: Jan. 10, 2012

(65) Prior Publication Data

US 2012/0181842 A1    Jul. 19, 2012

Related U.S. Application Data

(60) Provisional application No. 61/432,272, filed on Jan. 13, 2011.

(51) Int. Cl.
*B60N 2/00* (2006.01)
*B60N 2/22* (2006.01)

(52) U.S. Cl.
CPC ........................................ *B60N 2/22* (2013.01)
USPC ....................................................... 297/354.12

(58) Field of Classification Search
CPC ................................... B60N 2/22; A47C 1/024
USPC ............................. 297/354.1, 354.12; 16/2.1
See application file for complete search history.

(56) References Cited

U.S. PATENT DOCUMENTS

| | | | |
|---|---|---|---|
| 3,091,795 A * | 6/1963 | Budwig | 16/2.1 |
| 3,801,209 A | 4/1974 | Matsuoka | |
| 4,619,544 A | 10/1986 | Laidely | |
| 4,761,860 A * | 8/1988 | Krauss | 24/713.6 |
| 4,809,960 A | 3/1989 | Kakimoto et al. | |
| 4,883,319 A * | 11/1989 | Scott | 297/354.1 |
| 4,958,877 A | 9/1990 | Lezotte et al. | |
| 5,104,190 A | 4/1992 | Siegrist | |
| 5,331,695 A | 7/1994 | Bales | |
| 5,537,713 A | 7/1996 | Docteur | |
| 5,667,277 A * | 9/1997 | Van De Riet | 297/411.36 |
| 6,814,522 B1 | 11/2004 | Daniel, III | |
| 7,374,242 B2 | 5/2008 | Champ et al. | |
| 7,780,234 B2 | 8/2010 | Grable et al. | |
| 8,128,168 B2 * | 3/2012 | Hayashi et al. | 297/362 |
| 2002/0104187 A1 * | 8/2002 | Kakamu et al. | 16/2.1 |
| 2004/0124684 A1 * | 7/2004 | Bonk | 297/378.12 |
| 2007/0192993 A1 | 8/2007 | Selle | |
| 2007/0296257 A1 * | 12/2007 | Nathan et al. | 297/325 |
| 2008/0067854 A1 | 3/2008 | Rozkowski | |

FOREIGN PATENT DOCUMENTS

GB        2367857 A    4/2002

* cited by examiner

*Primary Examiner* — Milton Nelson, Jr.
(74) *Attorney, Agent, or Firm* — Gifford, Krass, Sprinkle, Anderson & Citkowski, P.C.; Douglas J. McEvoy

(57) ABSTRACT

A seat assembly including a pair of spaced apart lower sectors, each exhibiting an annular extending inner surface defining first and second aligning apertures, and an upper sector interposed between the spaced apart lower sectors and exhibiting a further annular extending inner surface defining a further aperture positioned between the aligning apertures of the lower sectors and defining a pivot point of the upper sector. A bushing and collar spacer are incorporated into the pivot point to maintain a desired spacing between the upper and lower sectors. A bushing exhibits male and female subassemblies, each further exhibiting an outer annular projecting perimeter lip such that the male bushing is installed through the aligning apertures in the upper and lower sector plates from the exterior side of a first selected lower sector, whereas the female bushing is installed from an exterior side of the other lower sector.

14 Claims, 4 Drawing Sheets

US 8,752,898 B2

MAIN PIVOT ASSEMBLY FOR INCORPORATING INTO A SEATBACK PIVOTLY SECURED BETWEEN FIRST AND SECOND SUPPORT PLATES

CROSS-REFERENCE TO RELATED APPLICATIONS

This Application claims the benefit of U.S. Provisional Application 61/432,272 filed on Jan. 13, 2011.

FIELD OF THE INVENTION

The present invention discloses a main pivot assembly for incorporation into a seat back assembly. More specifically, the invention discloses a seat assembly, such as incorporating an inertial latch between a pivotal upper seatback sector and a pair of spaced apart lower sectors, the assembly further incorporating a bushing and collar spacer for assembly through the pivot connection and which maintains a desired degree of spacing between the sectors.

DESCRIPTION OF THE PRIOR ART

The prior art is documented with various types of main pivot assemblies, such as which can be incorporated into a seat hinge or latch assembly. In most applications, the pivot assembly is supported between a pair of spaced apart support plates which are either bolted or otherwise secured to a frame location and which facilitating hinged or pivoting movement of one seat member, such as a seatback, headrest or other seat upper, relative to a lower seat member, and which varying upon application can include a seatback relative to an upper headrest or a seat bottom relative to a pivotally associated seat back.

SUMMARY OF THE PRESENT INVENTION

The present invention discloses a seat assembly such as including a pair of spaced apart lower sectors, each exhibiting an annular extending inner surface defining first and second aligning apertures, and an upper sector interposed between the spaced apart lower sectors and exhibiting a further annular extending inner surface defining a further aperture positioned between the aligning apertures of the lower sectors and defining a pivot point of the upper sector. A bushing and collar spacer are incorporated into the pivot point and which maintains a desired spacing between the upper and lower sectors.

Additional features include the bushing exhibiting a male and female assembleable bushing subassemblies, each of the bushing subassemblies further exhibiting an outer annular projecting perimeter lip such that the male bushing is installed through the aligning apertures in the upper and lower sector plates from the exterior side of a first selected lower sector, whereas the female bushing is installed from an exterior side of the other lower sector. Each of the bushing subassemblies are further constructed of a powderized metal, such as which can be cold headed or similarly formed and is intended to deformably accommodate an interference fit with each other.

The male bushing subassembly further includes a central projecting cylindrical portion, from an exterior surface of which extends a plurality of linear embossments or protuberances. The female bushing subassembly further includes an opposing projecting, slightly larger diameter and interiorly hollow open cylinder portion, within which resistively seats in interference fitting manner the cylindrical projection and associated outer extending embossments of the male bushing subassembly.

A lateral force absorbing spring washer is dimensioned to slide over an outer surface of the open cylinder portion of the female bushing subassembly and to compress against an inside of the female perimeter lip during assembly of the male/female bushing subassemblies. A collar spacer is also provided and exhibits a generally ring shape which is dimensioned to be generally centrally received relative to the aperture associated with the upper seatback sector, and, upon assembly, maintains the desired spacing between the inner seatback sector and outer supporting sectors, this including avoiding inward compression of the outer sectors.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As will be described in further detail below, the present invention discloses a main pivot assembly, generally depicted at 10, for incorporation into a seat back assembly. More specifically, the invention discloses a seat assembly, such as incorporating an inertial latch between a pivotal upper seatback sector and a pair of spaced apart lower sectors, the assembly further incorporating a bushing and collar spacer for assembly through the pivot connection and which maintains a desired degree of spacing between the sectors.

Figure 1:
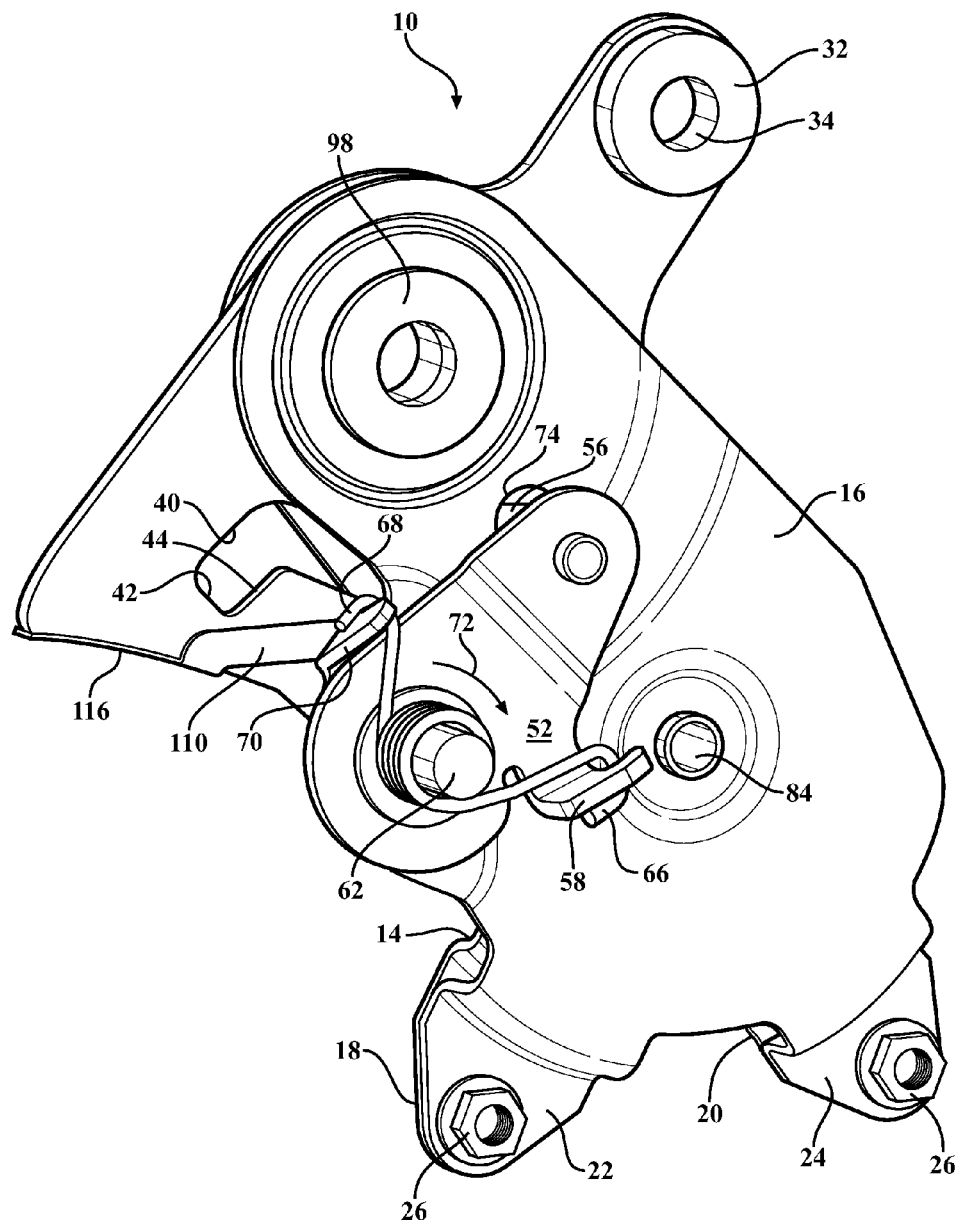
FIG. 1 is an assembled perspective of the main pivot assembly.
Figure 2:
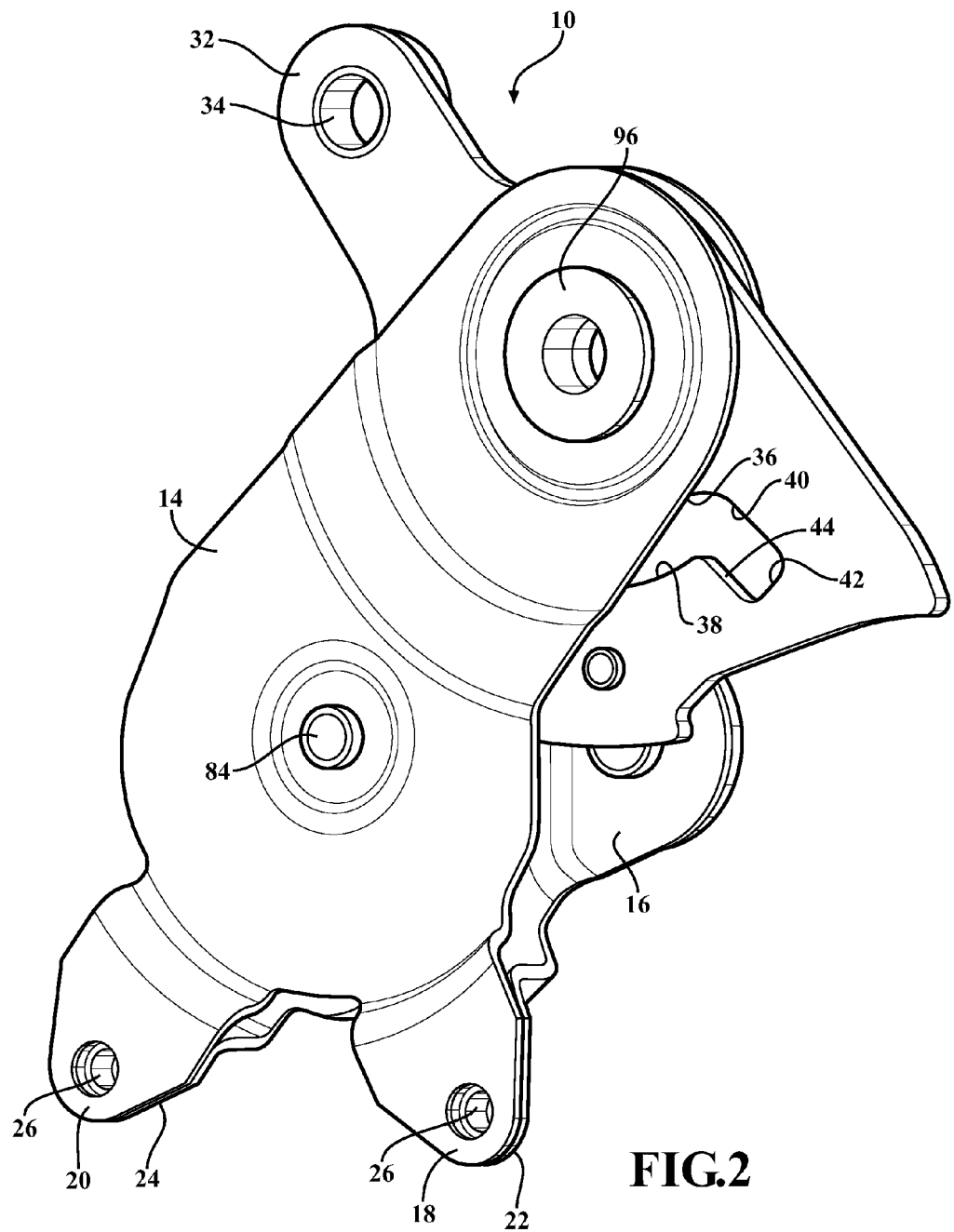
FIG. 2 is a reverse assembled perspective of the main pivot assembly of FIG. 1.
Figure 3:
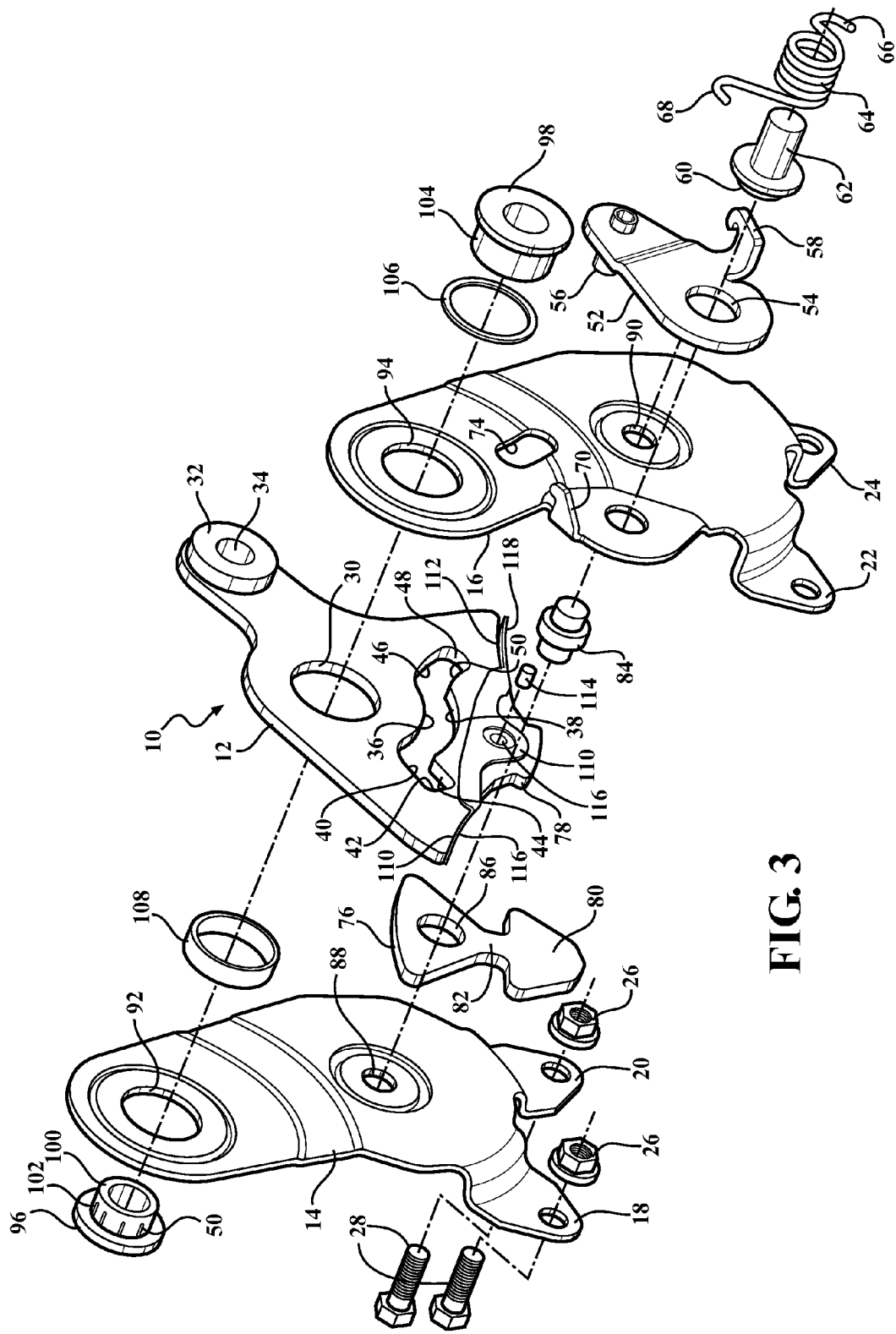
FIG. 3 is an exploded view of a seat assembly including an upper inertial latching pivoting sector disposed between a pair of spaced apart lower seat sectors and further illustrating a pair of assembleable bushings and collar spacer associated with the pivotal connection established between the upper and lower sectors for maintaining a desired dimensional.

Referring to the exploded view of FIG. 3, in combination with the first and second rotated assembled views of FIGS. 1-2, the seat assembly 10 is again shown and includes an upper inertial latching pivoting seatback sector 12 disposed between a pair of spaced apart lower seat sectors 14 and 16. Each of the components is constructed of a durable grade steel or other material exhibiting the necessary properties of durability and is not limited to any particular configuration or shape beyond exhibiting substantially planar extending support surfaces between which are disposed the various package elements associated with the pivot assembly.

Also, each of the seat sectors 14 and 16 further exhibit downwardly locations (such as ears or projections) and which are identified at 18 and 20 for sector 14 and further at 22 and 24 for sector 16. A pair of interiorly threaded mounting nuts 26 are provided and, upon assembly of the sectors as best shown in FIG. 1, exhibit the mounting nuts 26 with integral support washers supported in planar fashion upon exterior surface of the selected support plate 16. In this fashion, a pair of mounting bolts 28 (see FIG. 3) can be inserted through aligning inner perimeter extending apertures associated with each of the downward locations 18 & 20 and 22 & 24 such that the bolts 28 are assembled in inserting fashion and threadably engaged through the surface supported nuts 26, with projecting threaded ends of the bolt stems engaging side frame supporting locations (not shown) associated with the vehicle interior.

While not limited to any one specific type or variety of seat applications, the upper sector 12 can include such as a pivotal sector exhibiting a main pivot location (illustrated by an annular inner surface 30 as best shown in FIG. 3) and an upper end located mounting location 32 (such as further for securing a seat headrest or the like and including a rounded end profile further including a closed inner extending circular and aperture defining perimeter 34). As again best shown in FIG. 3, the upper sector 14 further exhibits a further interior extending channel or inner profile, this located below the annular inner surface 30 and which includes a central pseudo "smiley" face portion including central spaced apart and extending surfaces 36 and 38. Opposite end extending and downward angled portions are further depicted by interconnected sets of surfaces 40, 42 and 44 at a first end and further at 46, 48 and 50 at a second end (see again FIG. 3) and which combine with the central spaced apart surfaces 36 and 38 in order to configure a single elongated and interior channel profile depicting a multi-reverse angled and elongated channel or batwing profile.

A latch component 52 is provided which exhibits a generally oblong shape with an inner circular mounting perimeter surface 54 and a spaced and inwardly end extending mounting pin 56, and such as which provides restraint against sudden seatback rotation in response to a sudden inertial force.

The latch component 52 further includes a bent and hook shaped engaging portion 58 (again FIG. 3) and, with the latch component 52 mounted to an exterior surface of the support plate 16 via a pin with inner and annular shaped seating profile 60 and opposite outer extending stem 62, and which in turn supports a coil spring 64. A first curled end 66 of the spring 64 engages the hook shaped portion 58 of the latch component 52, with an opposite second curled end 68 engaging a further hook configured bent location 70 associated with a perimeter edge of the support plate 16, this in order to bias the latch 52 in a clockwise direction as viewed by directional arrow 72 in FIG. 1 and so that the inwardly and end extending mounting pin 56 associated with the latch 52 seats through an interior located and elongated channel profile (see inner elongated and perimeter surface 74 associated with the support sector 16 such that the latch component 52 is capable of a limited degree of motion about its pivot location 54 and relative to the pin 56 travelling within the channel profile 74 in support plate 16 relative to the inner translating and overlapping profile defined by the reverse smiley face or batwing profile collectively defined by inner and interconnecting central surfaces 36 and 38 and opposite end surfaces 40, 42 & 44 and 46, 48 & 50 (again FIG. 3), this occurring during concurrent and cross axial movement within the reverse smiley face or batwing profile 22 of the upper seatback sector 22.

As best shown in FIG. 3, additional latch components include a lower pivotally mounted pendulum including an upper pseudo triangular portion with an slight arcuate end surface 76 which exhibits an upper surface which is located in selective engagement with a corresponding lower protrusion 78 associated with a bottom of the seatback sector 12. In combination with the pin 56 seating through the support 16 channel 74 and overlapping batwing profile surfaces collectively referenced again at 36, 38, 40, 42, 44, 46, 48 and 50, the pendulum operates in response to a sudden deceleration force to engage the lower protrusion 78 and to prevent rapid fold down of the seatback sector 12. A further description of additional supporting structure (such as inertial leaf spring 110) is provided below and which facilitates the controlled and inertial restraining pivoting motion described herein.

As further shown, the pendulum includes a lower counterweight location 80 connected to the upper portion via a narrowed connection 82. Additional features include a pin 84 seating through an inner annular profile 86 defining a pivotal mounting location of the pendulum and which likewise seats through aligning aperture locations 88 and 90 associated with the outer seat sectors 14 and 16, respectively, to mount the pendulum 76 in selective contacting fashion with the protrusion 78 and undersides of the seatback sector 12. While the inertial supported seatback sector depicts one known application of the main pivot assembly, it is understood that the pivot assembly as described herein is also capable of being incorporated into other seating systems including a pivoting seatback, and further such as those not requiring inertial restraint.

Referring again to FIG. 1, the outer seat sectors 14 and 16 each further exhibit an inner annular surface profile, at 92 and 94, respectively, which align with the inner surface 30 of the interposed pivoting seatback sector 18. A bushing assembly is incorporated into the main pivot and includes a first (male) bushing subassembly 96 and a second (female) bushing subassembly 98.

Each of the bushing subassemblies 96 and 98 includes an outer annular projecting perimeter lip or edge, such that the male bushing subassembly 96 is installed through the aligning apertures 92, 30 and 94 from the exterior side of the sector 14, whereas the female bushing subassembly 98 is installed from the exterior side of the spaced apart sector 16. The bushing subassemblies 96 and 98 are each further constructed of a powderized metal, such as which can be cold headed or similarly formed and is intended to deformably accommodate an interference fit with each other, facilitated by the male bushing 96 further exhibiting a central projecting cylindrical portion 100, from an exterior surface of which extends a plurality of linear embossments or protuberances 102. The linear extending and circumferentially spaced apart protuberances are designed such that they fit within the inner annular surface of the female bushing 98.

The female bushing 98 includes a likewise projecting, slightly large and interiorly hollow open cylinder portion 104, within which resistively seats the annular projection 100 associated with the male cylindrical portion and associated outer extending embossments 102 of the male bushing subassembly 96. A spring washer 106 is dimensioned to slide over the open cylinder portion 104 of the female bushing subassembly 98 and to compress against an inside of the perimeter lip of the female bushing assembly 98 during assembly.

The spring washer 106 is designed such that it absorbs lateral forces associated with the seatback assembly associated with its normal use and in a fashion which dampens incidences of lateral misalignment. By design, the male bushing subassembly 96 bottoms out inside the female interior cylinder 104 thereby limiting the minimum spacing established between the respective outer perimeter extending flanges of the bushings abutting the exterior surfaces of the outer spaced sectors 14 and 16.

A collar spacer 108 is further provided and includes a metal (such as brass or possibly a heavy duty nylon) ring shaped insert which is dimensioned to be generally centrally received or seated relative to the aperture 18 associated with the seatback sector. The inner diameter of the spacer 108 is further dimensioned such that it receives in close tolerance the exterior of the cylindrical portion 104 associated with the female bushing 98 and, upon assembly, maintains the desired spacing between the plate surfaces associated with the inner seatback sector 12 and outer supporting sectors 14 and 16, this also including avoiding inward compression of the outer sectors 14 and 16 against the inner rotating seatback sector 12.

Figure 4:
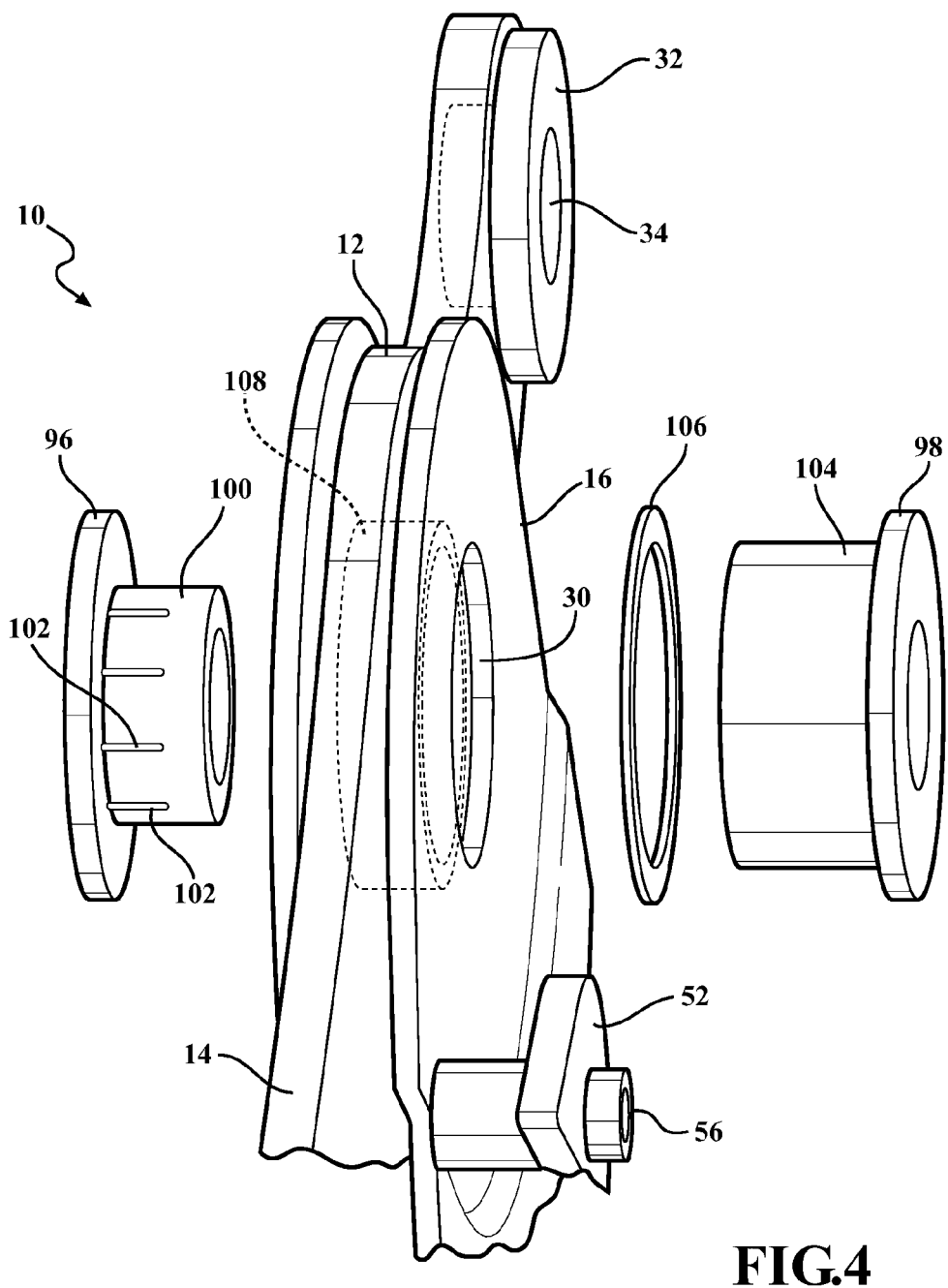
FIG. 4 is an enlarged, rotated and partially assembled view of the assembly in FIG. 1 and by which the collar spacer is installed at the pivotal interface established between the upper and lower sectors and better showing the assembleable nature of the two part male/female bushing and spring washer.

Referencing further FIG. 4, illustrated is an enlarged, rotated and partially assembled view of the assembly in FIG. 1 and by which the collar spacer 108 is installed at the pivotal interface established between the upper 12 and lower 14 and 16 sectors. FIG. 4 further depicts the sectors 12, 14 and 16 in partially transparent fashion in order to better illustrate the generally centralized location of the collar spacer 108 as well as the opposite side assembleable nature of the two part male/female bushing and spring washer.

Additional operational features associated with the inertial movement of the inner rotating seatback sector 12 relative to the fixed outer support plates 14 and 16 include provision of an inertial responsive leaf spring 110 (see as best shown in FIG. 3) which is secured to the underside of the rotating sector 12 in substantially aligning and interposing fashion with first 112 and second 112 bottom extending surfaces separated by the central protrusion 78. A sector rivet 114 engages through a central mounting location 116 associated with the leaf spring 110 and an adjoining mounting hole defined in a lower location of the rotating seatback sector 12, this in order to secure to the sector underside as depicted in FIG. 3.

First and second outwardly extending wing portions associated with the leaf spring 110, see at 116 and 118, are secured in closely spaced fashion relative to the bottom surfaces 110 and 112 of the inner rotating sector 12. In operation, the downward bias exerted by the inner extending pin 56, seating in the communicating channel portions associated with the batwing profile (again at 36 and 38 for central region and further at 40, 42 & 44 for first reverse/downwardly angled end profile, as well as at 46, 48 and 50 for second reverse/downwardly angled end profile) is counteracted by the slaved rotating motion of the inner sector 12 as further dictated by the limited pivotal range permitted by slotted configuration 74 defined in the outer sector 16.

Rotation of the outer sector 12 causes the spring biased pin 56 to successively travel from a first reverse arcuate portion (such as defined by selected end configured surfaces 46, 48 and 50) through central arcuate portion (opposing spaced apart surfaces 36 and 38), and finally to seat within the further reverse arcuate portion (defined by opposite end configured and interconnecting surfaces 40, 42 and 44). The downward bias exerted by the pin 56 creates a minimal degree of resistance at the reverse bend locations associated with the boundary zones established between central arcuate (smiley face) extending channel and the reverse angled end channel portions, this providing a degree of tactile engagement and from which a desired minimal degree of force is required to actuate the inner rotating sector 12 between two positions established with the outer fixed supports 14 and 16.

A further feature is to provide a degree of tactile engaging feel at each of first and second rotating positions, this provided by the effect of the (downward) biasing pin 56 passing through the reverse bend seating locations in the sector arcuate channel (i.e. again between central communicating section and opposite/downwardly angled end portions). The architecture between the bottom surfaces 110 and 112 and central underside protrusion 78 of the inner sector 12 and those of the upper surface 76 of the pendulum (with interposed inertial leaf spring 110) enable the pendulum to pivot the desired degree out of the way of the inner slaved rotating sector 12, this while providing the necessary inertial impacting and locking effect. This occurs regardless of the travel location of the inner sector at which the associated upper edge 76 of the pendulum would be rotated slightly into engagement with the central underside protrusion 78 of the inner sector 12 from either bottom surface 110 or 112. Accordingly, the complementing architecture of the inner rotating sector 12 and pendulum prevents rotation of the inner sector 12 between first and second positions, such as resulting from either of a rearward or forward impact occurrence.

Having described my invention, other and additional embodiments will become apparent to those skilled in the art to which it pertains, and without deviating from the scope of the appended claims.

I claim:

1. A seat assembly, comprising:
a pair of spaced apart lower sectors, each exhibiting an annular extending inner surface defining first and second aligning apertures;
an upper sector interposed between said spaced apart lower sectors and exhibiting a further annular extending inner surface defining a further aperture positioned between said aligning apertures of said lower sectors and defining a pivot point of said upper sector;
a bushing and collar spacer incorporated into said pivot point and which maintains a desired spacing between said upper and lower sectors; and
said bushing further including a male bushing subassembly and a female bushing subassembly, said male bushing subassembly further including a central projecting cylindrical portion, from an exterior surface of which extends a plurality of linear embossments, each of said bushing subassemblies further exhibiting an outer annular projecting perimeter lip, such that said male bushing subassembly is installed through said aligning apertures in said upper and lower sectors from the exterior side of a first selected lower sector, whereas said female bushing subassembly is installed from an exterior side of the other lower sector.

2. The invention as described in claim 1, each of said bushing subassemblies being further constructed of a powderized metal-for deformably accommodating an interference fit with each other.

3. The invention as described in claim 1, said female bushing subassembly further comprising an open cylinder portion opposing said central projecting cylindrical portion of said male bushing subassembly, said open cylinder portion having a larger diameter than said central projecting cylindrical portion, said open cylinder portion defining an open interior within which resistively seats in interference fitting manner said central projecting cylindrical portion and said embossments of said male bushing subassembly.

4. The invention as described in claim 3, further comprising a lateral force absorbing spring washer dimensioned to slide over an outer surface of said open cylinder portion of said female bushing subassembly and to compress against an inside of said female perimeter lip during assembly of said bushing subassemblies.

5. The invention as described in claim 1, said collar spacer exhibiting a generally ring shape which is dimensioned to be generally centrally received relative to said aperture associated with said upper sector, arid, upon assembly, maintains the desired spacing between said upper sector and said lower sectors, including avoiding inward compression of said lower sectors.

6. A seat assembly, comprising:
- a pair of spaced apart lower sectors each exhibiting a first pair of annular aligning apertures at upper locations, said sectors further exhibiting a second pair of aligning apertures at lower locations;
- an upper sector interposed between said spaced apart lower sectors and exhibiting a further annular extending inner surface defining a further aperture positioned between said first pair of aligning apertures of said lower sectors and defining a pivot point of said upper sector, said upper sector further comprising a configured bottom surface exhibited by a central protrusion;
- a pendulum exhibiting an upper triangular portion having a smooth and slightly arcuate upper surface and a lower counterweighting portion connected to said upper triangular portion by a narrowed connecting location, said pendulum including an interior aperture aligning with said pair of lower aligning apertures for mounting said pendulum in pivotal fashion between said lower sectors so that said upper surface selectively seats against one of first and second underside locations of said upper sector separated by said central protrusion;
- a bushing and collar spacer incorporated into said pivot point and which maintains a desired spacing between said upper and lower sectors; and
- said bushing further including a male bushing subassembly and a female bushing subassembly, said male bushing subassembly further including a central projecting cylindrical portion, from an exterior surface of which extends a plurality of linear embossments, each of said bushing subassemblies further exhibiting an outer annular projecting perimeter lip, such that said male bushing subassembly is installed through said aligning apertures in said upper and lower sectors from the exterior side of a first selected lower sector, whereas said female bushing subassembly is installed from an exterior side of the other lower sector.

7. The invention as described in claim 6, said female bushing subassembly further comprising an open cylinder portion opposing said central projecting cylindrical portion of said male bushing subassembly, said open cylinder portion having a larger diameter than said central projecting cylindrical portion, said open cylinder portion defining an open interior within which resistively seats in interference fitting manner said central projecting cylindrical portion and said embossments of said male bushing subassembly.

8. The invention as described in claim 7, further comprising a lateral force absorbing spring washer dimensioned to slide over an outer surface of said open cylinder portion of said female bushing subassembly and to compress against an inside of said female perimeter lip during assembly of said bushing subassemblies.

9. The invention as described in claim 6, said collar spacer exhibiting a generally ring shape which is dimensioned to be generally centrally received relative to said aperture associated with said upper sector, and, upon assembly, maintains the desired spacing between said upper sector and said lower sectors, including avoiding inward compression of said lower sectors.

10. The invention as described in claim 6, a reverse batwing channel profile defined in said upper sector and including a central arcuate portion communicating with first and second downwardly angled end extending portions, a further cross wise extending channel defined in a selected one of said lower sectors and overlapping said batwing profile, an inwardly extending pin supported upon an end of a latch component pivotally secured upon an exterior of said selected lower sector and so that said pin extends through said cross wise extending channel and into contact within said reverse batwing channel profile and which, in combination with said pendulum, exhibits restrained and inertial resistant motion during travel through said batwing profile concurrent with pivoting of said upper sector relative to said lower pair of spaced apart sectors.

11. The invention as described in claim 10, further comprising a further pin with an inner and annular shaped seating profile for pivotally supporting said latch component upon said selected lower sector, said pin further comprising an opposite outer extending stem which supports a coil spring, a first curled end of which engages a hook shaped portion of said latch component and a second opposite curled end of which engages a further hook configured bent location associated with a perimeter edge of said lower sector in order to bias said latch component and pivotally supported inwardly extending pin against said batwing profile.

12. The invention as described in claim 6, further comprising an inertial leaf spring secured to said underside of said upper sector such that first and extending wing portions overlay said separated underside locations, providing a degree of tactile engagement from which a desired minimal degree of force is required to actuate said upper sector between two positions established with said lower sectors.

13. The invention as described in claim 6, each of said lower sectors further comprising bottom extending locations through which are engaged bolt fasteners adapted to secure said lower sectors to supporting locations associated with a vehicle interior.

14. The invention as described in claim 6, each of said bushing subassemblies being further constructed of a powderized metal for deformably accommodating an interference fit with each other.

* * * * *